United States Patent
Tsuruhara

(10) Patent No.: US 7,983,405 B2
(45) Date of Patent: Jul. 19, 2011

(54) LINE SELECTION METHOD AND LINE SELECTION SYSTEM FOR PRIVATE BRANCH EXCHANGES

(75) Inventor: Koki Tsuruhara, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 1441 days.

(21) Appl. No.: 11/448,671

(22) Filed: Jun. 8, 2006

(65) Prior Publication Data

US 2007/0041546 A1    Feb. 22, 2007

(30) Foreign Application Priority Data

Jun. 9, 2005 (JP) ................... 2005-169031

(51) Int. Cl.
*H04M 3/00* (2006.01)
*H04M 3/42* (2006.01)
(52) U.S. Cl. .................. 379/198; 379/220.01
(58) Field of Classification Search .............. 379/198, 379/220, 220.01
See application file for complete search history.

(56) References Cited

U.S. PATENT DOCUMENTS 6,134,316 A * 10/2000 Kallioniemi et al. ..... 379/220.01

FOREIGN PATENT DOCUMENTS

| JP | 5-153234 A | 6/1993 |
| JP | 7-107162 A | 4/1995 |
| JP | 11-191811 A | 7/1999 |
| JP | 2004-312440 A | 11/2004 |

* cited by examiner

*Primary Examiner* — Rasha S Al Aubaidi
(74) *Attorney, Agent, or Firm* — Sughrue Mion, PLLC

(57) ABSTRACT

External lines 22 connected to a LAN 30 to establish pseudo private lines and having individual line numbers (for example, 5 and 3) are preliminarily assigned with the same identifier (for example, ID2). A sender PABX 10 transmits a call to a receiver PABX 10T and sends call information including ID2 of the line having the line number 5. The receiver PABX 10T acquires ID2 from the call information, selects the line having the line number 3 and assigned with ID2, and uses the line for communication. Between the two PABXs 10 and 10T, a combination of the lines having the line numbers 5 and 3 corresponding to ID2 can be fixedly used as the pseudo private line.

4 Claims, 7 Drawing Sheets

LINE SELECTION METHOD AND LINE SELECTION SYSTEM FOR PRIVATE BRANCH EXCHANGES

This application claims priority to prior Japanese patent application JP 2005-169031, the disclosure of which is incorporated herein by reference.

BACKGROUND OF THE INVENTION

This invention relates to an intracompany (or in-company) communication system including a plurality of private branch exchanges (such as Private Automatic Branch Exchanges (PABXs)) and key telephone apparatuses, connected to a LAN (Local Area Network), a WAN (Wide Area Network), or the Internet and, more particularly, to a line selection method and a line selection system for private branch exchanges which are capable of easily establishing private lines. This invention is applicable to any intragroup (or in-group) communication system, without being limited to an intracompany communication system, and is used to establish private lines in exchanges which are connected to a network to construct an exchange system.

In recent years, use is practically made of an intracompany exchange system in which a plurality of private branch exchanges are connected via a network, such as a LAN or a WAN, with VoIP (Voice Over Internet Protocol) introduced therein.

Referring to FIG. 1, a PABX (Private Automatic Branch Exchange) 110A accommodates a plurality of extension terminals 21 and are connected thereto, The PABX 110A is connected through external lines 22 having line numbers 5 and 6 to a LAN 30. Further, the LAN 30 (which serves as the network) is connected to a PABX 110B through external lines 22 having line numbers 1 and 2. Similarly, the LAN 30 is also connected to a PABX 110C through external lines having line numbers 3 and 4. Each of the line numbers 1 through 6 is assigned with an IP address in the LAN 30.

Therefore, if the PABX 110A originates or transmits a call using the line number 5 to the IP address of the line number 1 connected to the PABX 10B, the PABX 110B receives the call with the IP address of the line number 5 as a sender address and the IP address of the line number 1 as a destination address.

With the structure illustrated in the figure, if communications are performed between the two lines of the PABX 110A and the two lines of the PABX 110B, the PABX 110C can not establish external connection to each of the PABX 110A and PABX 110B. It is desired to avoid such a situation and to reserve at least one line available between every pair of the PABXs (between the PABX 110A and the PABX 110B, between the PABX 110B and the PABX 110C, and between the PABX 110A and the PABX 110C). Thus, in case where an intracompany LAN includes a plurality of PABXs, it is necessary to reserve a fixed connection line exclusively for communication between two specific points, such as a private line between the PABXs. However, no prior art disclosing such system is found.

In the intracompany exchange system using the network such as the LAN or the WAN with VoIP introduced therein, specific ones of the private branch exchanges may occupy all the lines in the network so that some of the private branch exchanges can not establish external connection. This is because no private line to fixedly connect every pair of the private branch exchanges is formed.

SUMMARY OF THE INVENTION

It is an object of this invention to provide a line selection method and a line selection system which are capable of establishing a pseudo private line for fixedly connecting private branch exchanges in an intracompany or intragroup communication system using a network such as a LAN or a WAN with VoIP introduced therein.

In this invention, a pseudo private line is established between every pair of private branch exchanges which select external lines upon forming a communication line in a network. For this purpose, those lines to form the pseudo private line between every pair of the private branch exchanges in the network are preliminarily assigned with a same identifier (ID). On transmitting a call to a receiver, the sender prepares call information including an identifier of a particular line and uses the particular line assigned with the identifier as a sender line. The receiver acquires the identifier from the call information and selects and uses as a receiver line a specific line assigned with the identifier thus acquired. In this manner, a combination of the lines defined by the same identifier can be fixedly used as the pseudo private line between the two particular private branch exchanges.

In the above-mentioned structure, even if the sender uses another line to transmit a call because the line assigned with the identifier is unavailable, line selection at the receiver is effective so that a substantial pseudo private line can be established although in a one-way manner.

A plurality of lines assigned with the same identifier may establish a line group of the same identifier. Those lines assigned with the same identifier may be assigned with priority orders in each of call transmission and call reception.

In a line selection method according to this invention, two particular private branch exchanges assign the same identifier to specific lines connected to a network. One of the private branch exchanges as a sender sends the identifier to the other private branch exchange as a receiver. The receiver selects the specific line assigned with the identifier and uses the specific line for communication. Thus, communication between the two private branch exchanges is always performed through the same lines according to the same identifier. A pair of the specific lines can used as a pseudo private line in call transmission and call reception.

Since those lines may be formed by communication channels, the network is not limited to the LAN, the WAN, or the Internet, but may be either a PSTN (Public Switched Telephone Network) or an ISDN (Integrated Services Digital Network). In case of the ISDN, this invention is particularly effective for use in a primary group interface having a number of channels.

In case where priority orders are given to a plurality of lines assigned with the same identifier, transmission priority and reception priority may be reversed in order so as to reduce collision in line selection for a pseudo private line according to the same identifier,

DESCRIPTION OF THE PREFERRED EMBODIMENTS

Figure 1:
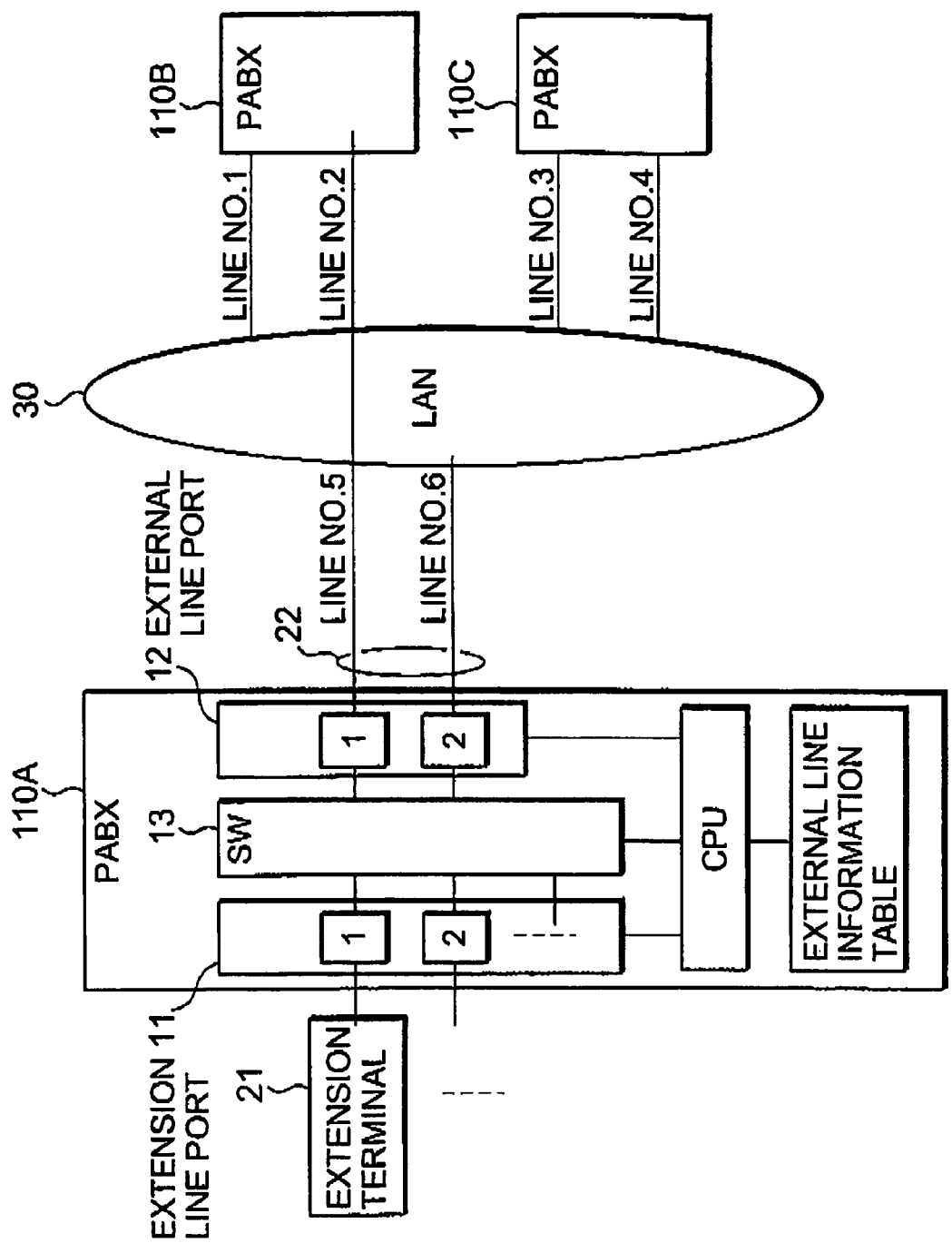
FIG. 1 is a view for describing an existing line selection system for private branch exchanges.

In this invention, a pseudo private line Is established between private branch exchanges by those lines connected via a network such as a LAN. For this purpose, the two particular private branch exchanges preliminarily assign the same identifier to lines connected to the network to form a single pseudo private line by a combination of those lines. When one of the private branch exchanges as a sender sends the identifier to the other private branch exchange as a receiver, the receiver selects the line assigned with the identifier and uses the line for communication.

Now, several preferred embodiments will be described with reference to the drawing. In the figures, only those parts related to this invention are shown and other parts are omitted for simplicity of illustration. The structures which will presently be described are illustrative only and may be replaced by other structures as far as the same functions are achieved.

First Embodiment

At first referring to FIG. 2, a line selection system for private branch exchanges (PABXs) according to a first embodiment of this invention will be described.

Figure 2:
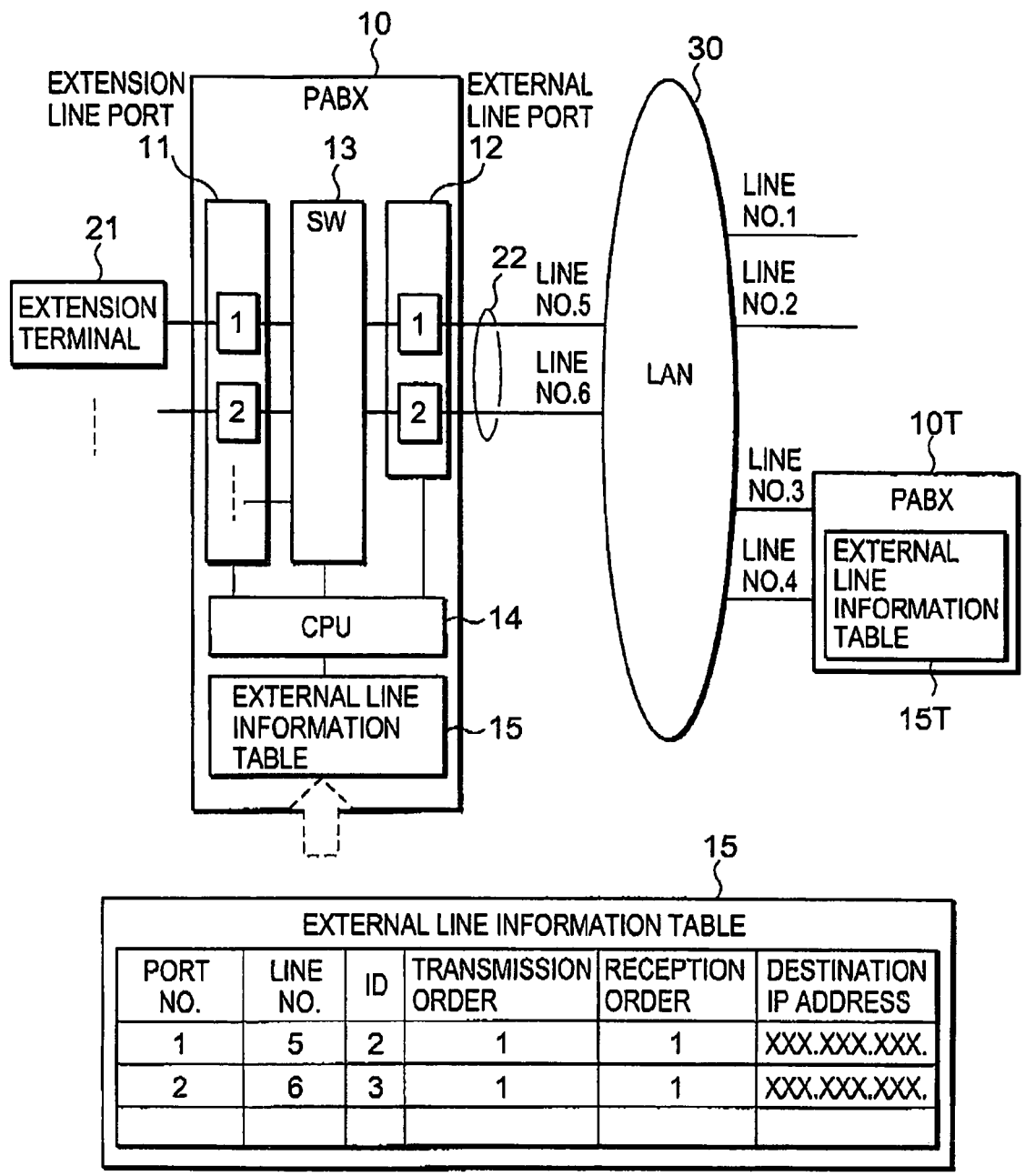
FIG. 2 is a view for describing a line selection system for private branch exchanges according to a first embodiment of this invention.

In FIG. 2, a plurality of private branch exchanges (PABXs) 10 and 10T are connected to a LAN 30 as a network. Each of the PABXs 10 and 10T serves to connect telephone sets via the LAN 30 using VoIP and to execute transmission and reception of voice information by the use of the H.323 protocol defined by the ITU (International Telecommunication Union) as a basic protocol.

The PABX 10 illustrated in the figure accommodates a plurality of extension terminals 21 on one hand and two LAN lines having line numbers 5 and 6 and connected to the LAN 30 as external lines 22 on the other hand. The PABX 10 comprises an extension line port 11, an external line port 12, a switch (SW) 13, a CPU (control means) 14, and an external line information table 15. The PABX 10T has the similar structure and is connected to the LAN 30 through LAN lines having line numbers 3 and 4 as external lines.

The extension line port 11 connects the extension terminals 21 to respective ports and informs the CPU 14 of the state of each extension terminal 21. In addition, the extension line port 11 transmits and receives information between the extension terminals 21 and the CPU 14. A communication line during communication is connected to the SW 13. The external line port 12 accommodates, as the external lines 22, the lines having the line numbers 5 and 6 in the LAN 30 and transmits and receives information between the LAN 30 and the CPU 14. A communication line during communication is connected to the SW 13. The SW 13 connects the extension lines and the external lines by communication channels under control of the CPU 14.

The CPU 14 is connected to each component of the PABX 10 and executes various functions under control of a program. Communication is carried out using VoIP according to the H.323 protocol.

The external line information table 15 preliminarily memorizes external line information. In the figure, only a part of port numbers 1 and 2 for the external lines 22 is shown. The port number 1 for the external line 22 is preliminarily assigned with the line number 5 in the LAN 30 and an identifier (hereinafter abbreviated to an ID) 2. Since only a single line corresponds to a single ID, each of a transmission order and a reception order for priority selection is "1". Similarly, the port number 2 for the external line 22 is preliminarily assigned with the line number 6 in the LAN 30 and ID3. Since only a single line corresponds to a single ID, each of a transmission order and a reception order for priority selection is "1". In the external line information table 15, a destination IP address to which a pseudo private line is to be connected is set for each of the line numbers 5 and 6 connected to the LAN 30 to form the pseudo private line according to each ID.

The IP address is assigned to each extension terminal with the PABX used as a gateway. Further, the PABX itself may have an IP address. In this embodiment, the PABX 10T to which the pseudo private line is to be connected has an IP address. Such address may be given in correspondence to each line number in the LAN 30. For example, the line numbers 1 to 6 illustrated in the figure may be assigned with different addresses, respectively.

In the above-mentioned structure, it is assumed that the LAN line of the line number 5 and the LAN line of the line number 3 are assigned with ID2 to form an ID2 private line. In this event, ID2 Is preliminarily assigned to the line number 3 in the external line information table 15T of the PABX 10T. As a consequence, when the PABX 10 transmits a call using the LAN line of the line number 5 and sends ID2 to the PABX 10T, the PABX 10T selects the LAN line of the line number 3 for communication in accordance with ID2 thus received. Thus, the call from the line of the line number 5 is always received by the line of the line number 3. The above also applies in case where a call is transmitted from the line of the line number 3 to the line of the line number 5.

In the figure, the LAN lines having the line numbers 5 and 6 alone are shown as the external lines 22 connected to the external line port 12 of the PABX 10 to establish the pseudo private line and the IP address is used as a destination address. However, communication lines connected to a PSTN (Public Switched Telephone Network) capable of transmitting calls to dial numbers as destination addresses may be accommodated in the external line port 12 as external lines.

Second Embodiment

Figure 3:
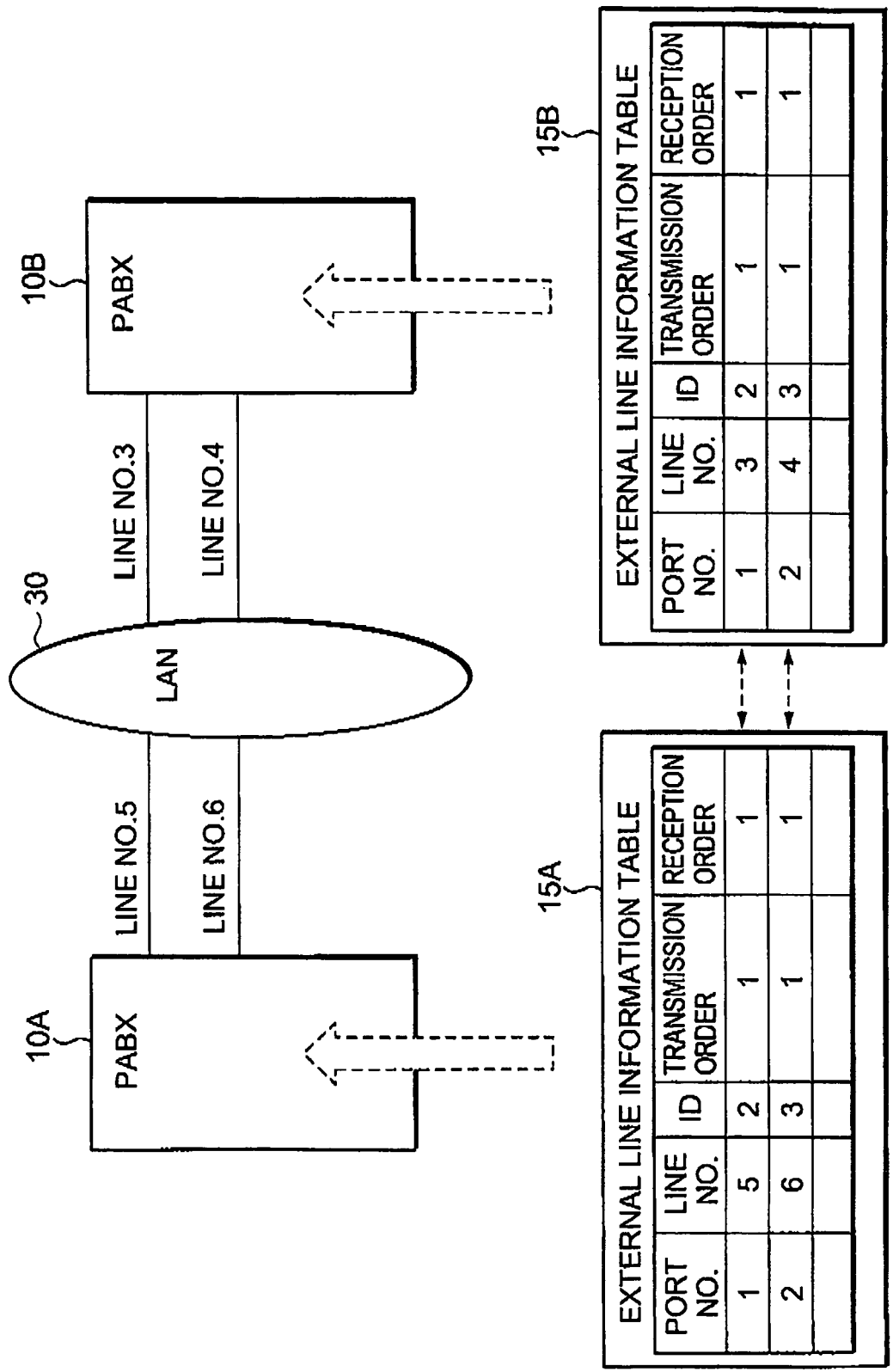
FIG. 3 is a view for describing a line selection system for private branch exchanges according to a second embodiment of this invention.

Referring to FIG. 3, description will be made of formation of a private line between private branch exchanges according to a second embodiment of this invention.

In FIG. 3, a private line is established between two PABXs 10A and 10B connected to the LAN 30 similar to that in FIG. 2.

Each of the PABXs 10A and 10B illustrated in the figure is basically similar in structure to the PABX 10 in the first embodiment. In each of external line information tables 15A and 15B, an IP address of a destination PABX for which a private line is to be established is preliminarily set although it is not shown.

In the external line information table 15A of the PABX 10A, only a part of the port numbers 1 and 2 for external lines is shown. The port number 1 for the external line is preliminarily assigned with the line number 5 In the LAN 30 and ID2 as an ID2 private line. Since only a single line-corresponds to a single ID, each of a transmission order and a reception order for priority selection is "1". Similarly, the port number 2 for the external line is preliminarily assigned with the line number 6 in the LAN 30 and ID3 as an ID3 private line. Since only a single line corresponds to a single ID, each of a transmission order and a reception order for priority selection is "1".

In the external line information table 15B of the PABX 10B, only a part of the port numbers 1 and 2 for external lines is shown. The port number 1 for the external line is preliminarily assigned with the line number 3 in the LAN 30 and ID2 as the ID2 private line. Since only a single line corresponds to a single ID, each of a transmission order and a reception order for priority selection is "1"Similarly, the port number 2 for the external line is preliminarily assigned with the line number 4 in the LAN 30 and ID3 as the ID3 private line. Since only a single line corresponds to a single ID, each of a transmission order and a reception order for priority selection is "1".

In the above-mentioned structure, it is assumed that the ID2 private line is established. In this event, upon call transmission, the PABX 10A selects the line number 5 from ID2 in the external line information table 15A and, by the use of the LAN line of the line number 5, transmits call information Including the destination IP address of the PABX 10B and ID2 to the LAN 30. The LAN 30 sends the call information to the PABX 10B with reference to the destination IP address retrieved by the line number 5. The PABX 10B acquires ID2 from the call information. Then, the PABX 10B obtains the line number 3 from ID2 in the external line information table 15B and selects the LAN line of the line number 3 to receive the call. Thus, by designating an ID number, a pseudo private line is formed by a combination of the LAN lines having fixed numbers.

If the destination IP address received by the LAN 30 does not belong to the PABX 10B, the PABX 10B can not acquire the line number corresponding to ID2. Therefore, the pseudo private line can not be established and the call is rejected so that no communication is performed.

With the above-mentioned structure, the LAN lines are fixedly connected to form the pseudo private line by designating the ID number. In addition, without designation of the ID number, the pseudo private line can not be occupied from others. Thus, the lines set between the PABX can be reserved as the private line.

Third Embodiment

Figure 4:
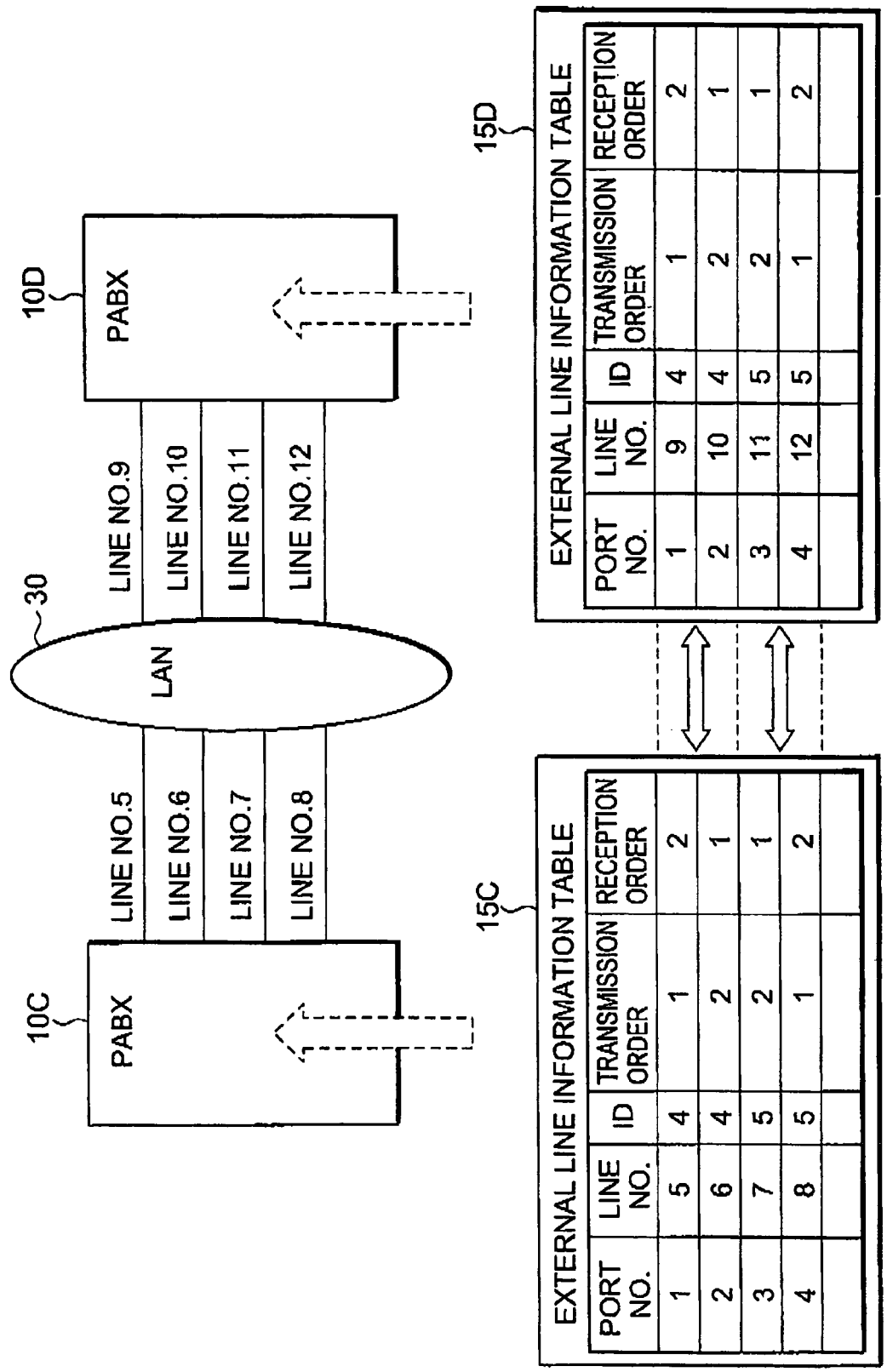
FIG. 4 is a view for describing a line selection system for private branch exchanges according to a third embodiment of this invention.
Figure 5:
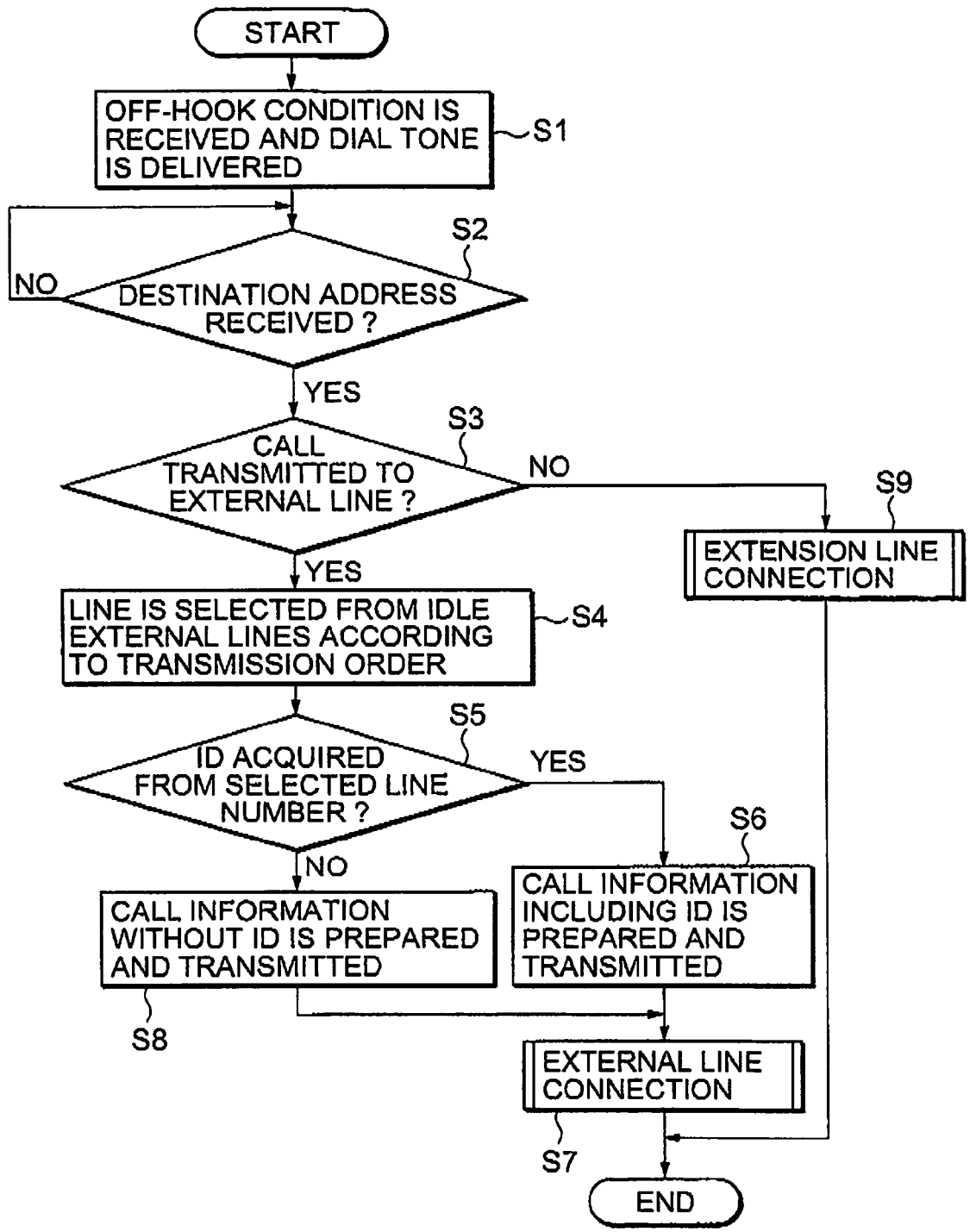
FIG. 5 is a flow chart for describing a call transmission procedure in the line selection system in FIG. 4.
Figure 6:
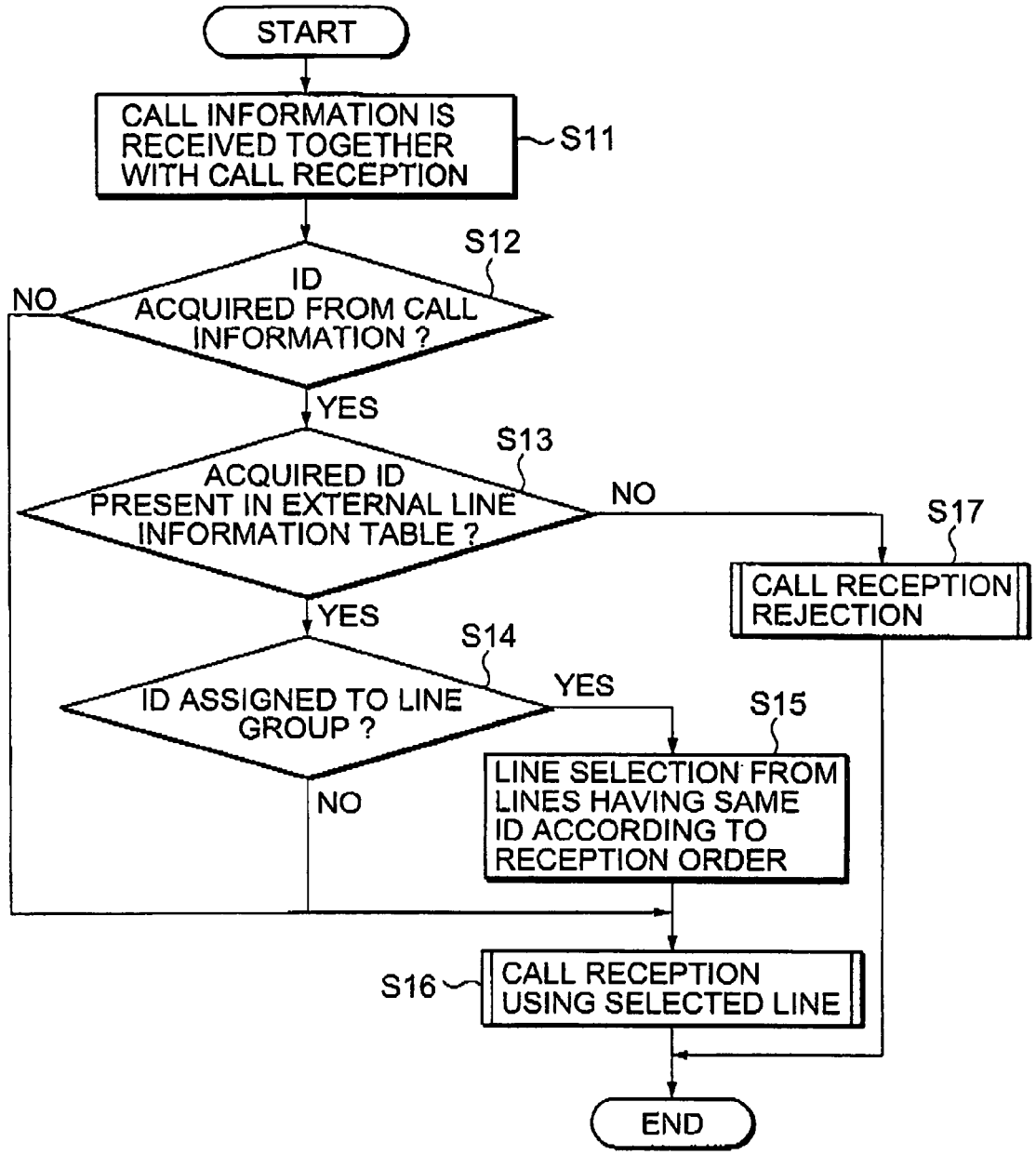
FIG. 6 is a flow chart for describing a cell reception procedure in the line selection system in FIG. 4.

Referring to FIGS. 4 to 6, a third embodiment of this invention will be described.

Referring to FIGS. 4 to 6, formation of a private line between the private branch exchanges according to the third embodiment of this invention will be described.

In FIG. 4, a private line is established between two PABXs 10C and 10D connected to the LAN 30 similar to that in FIG. 2.

Each of the PABXs 10C and 10D illustrated in the figure is basically similar in structure to the PABX 10 in the first embodiment. In each of external line information tables 15C and 15D, an IP address of a destination PABX to which a private line is to be connected is preliminarily set although it is not shown.

In the external line information table 15C of the PABX 10C, only a part of port numbers 1 through 4 for external lines is shown. The port numbers 1 through 4 for the external lines are preliminarily assigned with line numbers 5 through 8 in the LAN 30, respectively. The line numbers 5 and 6 are preliminarily assigned with an ID4 in common as a plurality of ID4 private lines. As priority orders upon selection, the line number 5 is preliminarily given a transmission order 1 and a reception order 2. The line number 6 is preliminarily given a transmission order 2 and a reception order 1. On the other hand, the line numbers 7 and 8 are preliminarily assigned with an ID5 in common as a plurality of ID5 private lines. Further, as priority orders upon selection, the line number 7 is preliminarily given a transmission order 1 and a reception order 2. The line number 8 is preliminarily given a transmission order 2 and a reception order 1.

In the external line information table 15D of the PABX 10D, only a part of port numbers 1 through 4 for external lines is shown. The port numbers 1 through 4 for the external lines are preliminarily assigned with line numbers 9 through 12 in the LAN 30, respectively. The line numbers 9 and 10 are assigned with an ID4 in common as a plurality of ID4 private lines. As priority orders upon selection, the line number 9 is preliminarily given a transmission order 1 and a reception order 2. The line number 10 is preliminarily given a transmission order 2 and a reception order 1. On the other hand, the line numbers 11 and 12 are preliminarily assigned with an ID5 in common as a plurality of ID5 private lines. Further, as priority orders upon selection, the line number 11 is preliminarily given a transmission order 1 and a reception order 2. The line number 12 is preliminarily given a transmission order 2 and a reception order 1.

For example, it is assumed that the PABX 10C is going to communicate with the PABX 10D by the use of the ID4 private line. In this event, upon call transmission, the PABX 10C selects the line number 5 from ID4 and the transmission order 1 in the external line information table 15C and transmits call information including the destination IP address of the PABX 10D and ID4 to the LAN 30 by the use of the LAN line of the line number 5. The LAN 30 sends the call information to the PABX 10D in accordance with the destination IP address. Therefore, the PABX 10D acquires ID4 from the call information, obtains the line number 9 from ID4 and the reception order 1 in the external line information table 15D, and selects the LAN line of the line number 9 to receive the call. Thus, by designating the ID number, a private line can be formed by a combination of the LAN lines having fixed numbers.

With the above-mentioned structure, if the line having the order 1 is occupied and unavailable, an idle line of a next order is selected. Therefore, by reversing the transmission order and the reception order, it is possible to reduce collision upon line selection by call transmission and call reception.

Next, referring to FIG. 5 in combination with FIG. 4, description will be made of a call transmitting operation of the PABX 10C.

At first, upon reception of an off-hook condition from an extension terminal, the PABX 10C delivers a dial tone (step S1) and waits for arrival of a destination address (NO in step S2). When the IP address of the PABX 10D is received as a destination (YES in step S2), the PABX 10C judges call transmission to an external line (YES in step S3) and searches the external line information table 15C with the destination IP address to obtain the line numbers 5 to 8. Next, the PABX 10C selects, from the line numbers 5 to 8, one of idle lines which has a highest priority order of transmission, for example, the line number 8 (step S4). The PABX 10C again searches the external line information table 15C to acquire ID5 from the line number 8 (YES in step S5). The PABX 10C prepares call information including the destination IP address and ID5 thus acquired and transmits a call to the LAN 30 with designation of the line number 8 (step S6). Subsequently, operation proceeds to external line connection for establishing a communication line (step S7), calling of a called party, and execution of communication upon reception of an answer.

If no ID can be acquired from the external line information table 15C (NO in step S5), a line number without an ID is selected. Call information without an ID is prepared and transmitted (step S8). The operation proceeds to the above-mentioned step S7. In this case, the PABX 10C selects a general external line instead of the private line. If call transmission is not addressed to an external line (NO in step S3), predetermined extension line connection is executed (step S9).

Next, referring to FIG. 6 in combination with FIG. 4, a call receiving operation of the PABX 10D will be described.

Upon reception of the call from the LAN 30 together with the call information (step S11), the PABX 10D acquires ID5 from the call information (YES in step SI2). The PABX 10D confirms that ID5 is present in the external line information table 15D (YES in step S13). If ID5 corresponds to a line group (YES in step S14), the PABX 1D selects, from idle lines of the line numbers 11 and 12 corresponding to ID5, the line number 11 having a highest-priority reception order 1 (step S15) and executes the call receiving operation on the LAN line of the line number 11 (step S16).

In case where no ID can be acquired from the call information (NO in step S12), the operation proceeds to the step S7 because the private line is not selected as the external line. The call receiving operation is executed by selecting a general external line. If the ID is not present in the external line information table 15D (NO in step S13), designation of a private line to another PABX or a faulty operation is judged and predetermined call reception rejection is executed (step S17).

In this embodiment, two line groups each of which has two lines are shown. However, the scale is not relevant to this invention. As the lines and the line groups between the PABXs are increased in number, call loss is decreased.

Fourth Embodiment

Figure 7:
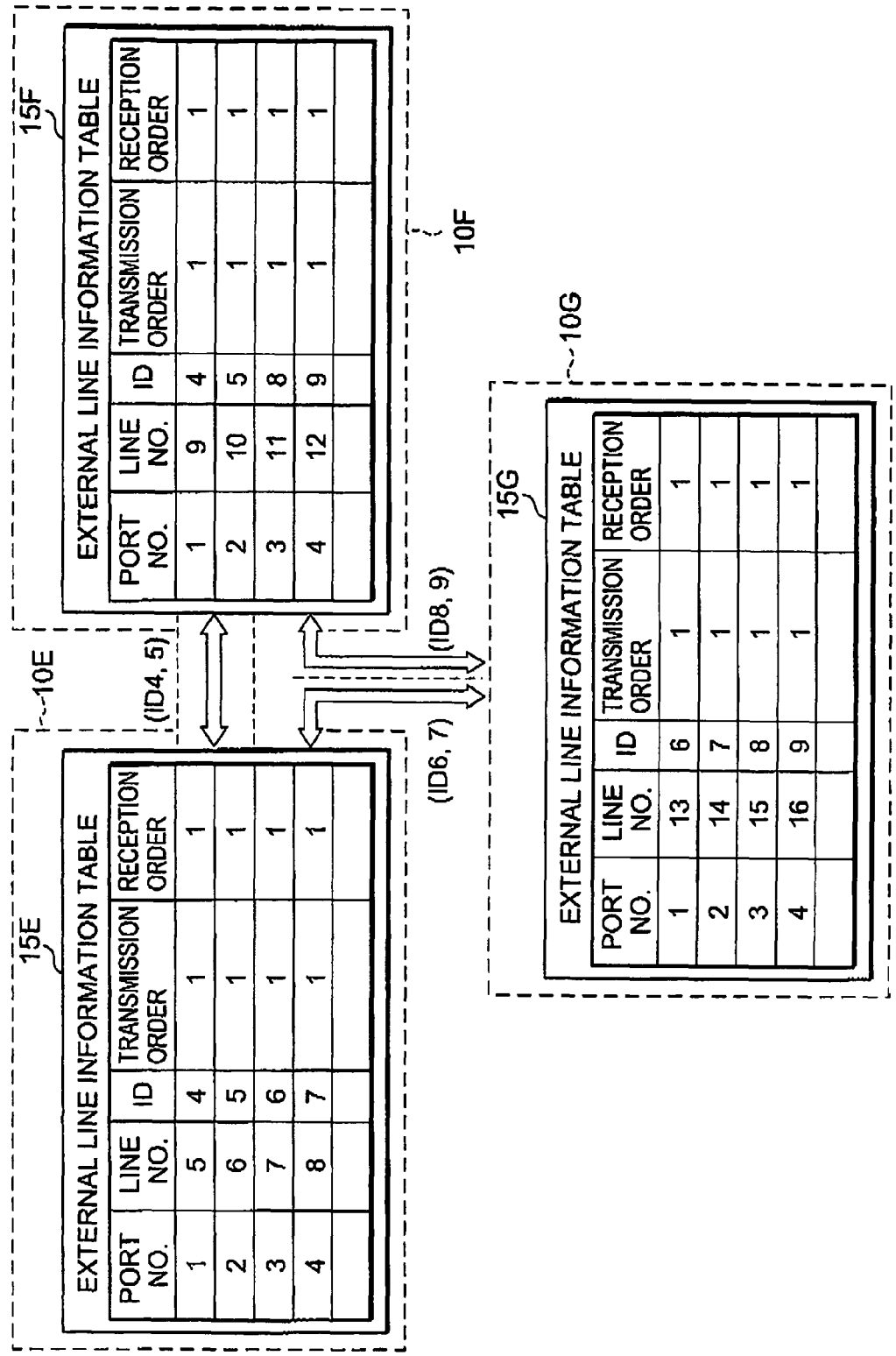
FIG. 7 shows external line information tables in a line selection system for private branch exchanges according to a fourth embodiment of this invention.

Referring to FIG. 7, description will be made of a fourth embodiment of this invention.

In this embodiment, PABXs 10E, 10F, and 10G are connected to one another via pseudo private lines. The PABXs 10E, 10F, and 10F have external line information tables 15E, 15F, and 15G, respectively.

Each of the PABXs 10E, 10F, and 10G is basically similar in structure to the PABX 10 in the first embodiment. In each of the external line information tables 15E, 15F, and 15G, and IP address of a destination PABX to which a private line is to be connected is preliminarily set although it is not shown.

In the external line information table 15E of the PABX 10E, only a part of port numbers 1 through 4 for external lines is shown. The port numbers 1 through 4 for the external lines are preliminarily assigned with line numbers 5 through 8 in the LAN 30, respectively. The line numbers 5 through 8 are preliminarily assigned with ID4 through ID7 as ID4 through ID7 private lines, respectively. Since only a single line corresponds to a single ID, each of a transmission order and a reception order for priority selection is "1"

In the external line information table 15F of the PABX 10F, only a part of port numbers 1 through 4 for external lines is shown. The port numbers 1 through 4 for the external lines are preliminarily assigned with line numbers 9 through 12 in the LAN 30, respectively. The line numbers 9 and 10 are preliminarily assigned with 1D4 and ID5 as ID private lines, respectively. The line numbers 11 and 12 are preliminarily assigned with ID8 and ID9 as ID private lines, respectively. Since only a single line corresponds to a single ID, each of a transmission order and a reception order for priority selection is "1"

In the external line information table 15G of the PABX 10G, only a part of port numbers 1 through 4 for external lines is shown. The port numbers 1 through 4 for the external lines are preliminarily assigned with line numbers 13 through 16 in the LAN 30, respectively. The line numbers 13 through 16 are preliminarily assigned with ID6 through ID9 as ID6 through ID9 private lines, respectively. Since only a single line corresponds to a single ID, each of a transmission order and a reception order for priority selection is "1".

Therefore, for ID4 and ID5, a combination of the line numbers 5 and 9 and a combination of the line numbers 6 and 10 establish the ID4 private line and the ID5 private line between the PABXs 10E and 10F, respectively. For ID6 and ID7, a combination of the line numbers 7 and 13 and a combination of the line numbers 8 and 14 establish the ID6 private line and the ID7 private line between the PABXs 10E and 10G, respectively. For ID8 and ID9, a combination of the line numbers 11 and 15 and a combination of the line numbers 12 and 16 establish the ID8 private line and the ID9 private line between the PABXs 10F and 10G, respectively.

Thus, the pseudo private lines corresponding in number to the traffic are provided as lines or line groups between every pair of the PABXs. In this manner, even in a busy hour, communication via the pseudo private line Is possible. For example, in case where urgent notice to all PABXs is required, immediate communication by interruption is possible.

Other Embodiments

In the foregoing embodiments, an IP address is used to establish a private line. Therefore, in case where an extension terminal is a telephone set, the PABX is required to have a function of conversion between the dial number and the IP address as a gateway.

In the foregoing embodiments, the IP network such as the LAN or the WAN is described. However, the external lines may be a plurality of B channels as in a primary group interface of an ISDN used in a PSTN. In this case, as described above, specific channels are assigned with ID numbers to establish a pseudo private line. In this case, the destination address may be a dial number. The PABX may have, as external lines, a mixture of lines connected to the IP network and lines connected to the PSTN.

Thus, private lines formed by directly connecting wired/radio independent links are replaced by pseudo private lines. For example, via a global network such as the Internet, a communication channel equivalent to the private line can be formed as a pseudo private line between private branch exchanges at remote places.

In the foregoing description, the private branch exchanges are PABXs. However, it will readily be understood that a key telephone apparatus may have similar functions.

According to this invention, in case where a plurality of private branch exchanges are connected via external lines to a network to construct an exchange system, the external lines are assigned with identifiers, respectively. In two specific private branch exchanges, those lines having the same identifier are set and designated, respectively. Upon call reception, one of the private branch exchanges as a receiver selects the line having the identifier sent from the other private branch exchange as a sender and use the line for communication.

Thus, this invention is applicable to establishment of a pseudo private line in place of a so-called private line which is formed by directly connecting communication channels in order to reserve a minimum number of communication channels, for example, for urgent communication, between exchanges located at remote places and communicating with each other via a communication network.

Although this invention has been described in conjunction with a few preferred embodiments thereof, this invention may be modified in various other manners within the scope of the appended claims.

What is claimed is:

1. A line selection method for a plurality of private branch exchanges connected to one another via a network and network lines connected between the private branch exchanges and the network,
   wherein every pair of the private branch exchanges are preliminary provided with line information tables to assign a same identifier to their respective network lines connected to the network to form a pseudo private line by a combination of these network lines, one of the private branch exchanges as a sender sending the identifier upon call transmission, the other private branch exchange as a receiver selecting the network line assigned with the identifier sent from the sender and using the network line for communication.

2. The line selection method according to claim 1, wherein the network is an IP (Internet Protocol) network with VoIP (Voice Over Internet Protocol) introduced therein, the identifier being given to each VoIP line and informed between the private branch exchanges using the H.323 protocol defined by the ITU (International Telecommunication Union).

3. A line selection system for a private branch exchange connected to a counterpart private branch exchange via network and network lines connected between the private branch exchange and the network and between the network and the counterpart private branch exchange,
   wherein the private branch exchange and the counterpart private branch exchange comprise line information tables to assign a same identifier to their respective network lines connected to the network to form a pseudo private line by a combination of these network lines and
   wherein, when one of the private branch exchange and the counterpart private branch exchange as a sender sends the identifier upon call transmission, the other private branch exchange of the private branch exchange and the counterpart private branch exchange as a receiver selects the network line assigned with the identifier sent form the sender and uses the network line for communication.

4. The line selection system according to claim 3, wherein the network is an IP (Internet Protocol) network with VoIP (Voice Over Internet Protocol) introduced therein, said one of the private branch exchange and the counterpart private branch exchange informing said other private branch exchange of the identifier given to each VoIP line using the H.323 protocol defined by the ITU (International Telecommunication Union).

* * * * *